(12) United States Patent
Pyeon

(10) Patent No.: US 10,601,287 B2
(45) Date of Patent: Mar. 24, 2020

(54) CIRCUIT BOARD, MOTOR AND ELECTRONIC POWER STEERING SYSTEM

(71) Applicant: LG INNOTEK CO., LTD., Seoul (KR)

(72) Inventor: Jin Su Pyeon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/517,770

(22) Filed: Jul. 22, 2019

(65) Prior Publication Data

US 2019/0341832 A1 Nov. 7, 2019

Related U.S. Application Data

(63) Continuation of application No. 15/211,570, filed on Jul. 15, 2016, now Pat. No. 10,374,494.

(30) Foreign Application Priority Data

Aug. 4, 2015 (KR) .................. 10-2015-0109884

(51) Int. Cl.
*H02K 11/215* (2016.01)
*B62D 5/04* (2006.01)
*H02K 29/08* (2006.01)
*H02K 5/16* (2006.01)
*H02K 5/22* (2006.01)

(52) U.S. Cl.
CPC ......... *H02K 11/215* (2016.01); *B62D 5/0403* (2013.01); *B62D 5/0406* (2013.01); *H02K 5/161* (2013.01); *H02K 5/225* (2013.01); *H02K 29/08* (2013.01); *H02K 2213/06* (2013.01)

(58) Field of Classification Search
CPC ............................ H02K 11/215; H02K 5/161
USPC ........................................................ 310/68 B
See application file for complete search history.

(56) References Cited

U.S. PATENT DOCUMENTS

| | | |
|---|---|---|
| 2009/0079280 A1 | 3/2009 | Terauchi et al. |
| 2012/0049698 A1 | 3/2012 | Horng et al. |
| 2012/0229005 A1 | 9/2012 | Tominaga et al. |
| 2013/0026888 A1 | 1/2013 | Migita et al. |
| 2014/0015384 A1 | 1/2014 | Someya et al. |
| 2014/0132123 A1* | 5/2014 | Berney .................. G01R 33/07 310/68 B |
| 2014/0167572 A1 | 6/2014 | Woo |
| 2015/0381017 A1 | 12/2015 | Kitaji et al. |
| 2016/0276907 A1 | 9/2016 | Kloer et al. |

FOREIGN PATENT DOCUMENTS

| | | |
|---|---|---|
| CN | 102904388 A | 1/2013 |
| EP | 2031354 A2 | 3/2009 |
| WO | WO 2006/109714 A1 | 10/2006 |
| WO | WO 2015/067497 A2 | 5/2015 |

\* cited by examiner

*Primary Examiner* — Hanh N Nguyen
(74) *Attorney, Agent, or Firm* — Birch, Stewart, Kolasch & Birch, LLP

(57) ABSTRACT

The present disclosure provides techniques for securing a running stability of a vehicle, whereby danger of safety accident can be significantly reduced during operation of a vehicle by enabling a minimum number of Hall elements to be driven even during damage to a power terminal or to a ground unit due to defect in circuit by separately forming a power terminal supplying a power to a plurality of magnetic elements in a plurality of numbers.

30 Claims, 2 Drawing Sheets

CIRCUIT BOARD, MOTOR AND ELECTRONIC POWER STEERING SYSTEM

CROSS-REFERENCE TO RELATED APPLICATIONS

This application is a Continuation of copending U.S. application Ser. No. 15/211,570, filed on Jul. 15, 2016, which claims priority under 35 U.S.C. § 119(a) to Korean Patent Application Number 10-2015-0109884, filed on Aug. 4, 2015, the entire contents of which are incorporated by reference herein in their entirety.

BACKGROUND OF THE INVENTION

Field of the Invention

The teachings in accordance with the exemplary embodiments of this present disclosure generally relate to techniques for securing a running stability of a vehicle.

Description of Related Art

In general, in order to guarantee a steering stability of a vehicle, there is required a steering system that assists the vehicle by a separate power. Although a conventional auxiliary steering system has employed a system using a hydraulic power, an EPS (Electronic Power Steering System) is recently employed that is less in power consumption and excellent in accuracy. The EPS is operated in a manner such that a motor is driven by an ECU (Electronic Control Unit) in response to operation conditions detected by a vehicle speed sensor, a torque angle sensor and a torque sensor to guarantee a turning stability and to provide a quick stability restoring force, whereby a driver can operate a vehicle safely.

A magnetic element mounted on a PCB (Printed Circuit Board) in the EPS motor provides a motor control-functioning ECU with position information of a rotor, where, although driving of the magnetic element sensing a magnetic signal is essential, the magnetic element may be deprived of its function to disadvantageously result in danger of safety accident due to deprivation of function of the magnetic element when a power supplied to a Hall element is interrupted due to defect in circuit or a ground unit is broken.

SUMMARY OF THE DISCLOSURE

The present disclosure is provided to solve the aforementioned disadvantage(s) and therefore, an exemplary embodiment of the present disclosure is to provide a motor configured to significantly reduce danger of safety accident during operation of a vehicle by enabling a minimum Hall element to be driven even during damage to a power terminal or to a ground unit due to defect in circuit by separately forming a power terminal supplying a power to a Hall element in a plurality of numbers.

In one general aspect of the present disclosure, there is provided a circuit board, comprising: a first magnetic element part; a second magnetic element part separately formed from the first magnetic element part; a first power terminal electrically connected to the first magnetic element part; and a second power terminal electrically connected to the first power terminal by being separately formed from the first power terminal.

Preferably, but not necessarily, the first magnetic element part may be disposed on a first circular arc having a first radius, and the second magnetic element part may be disposed on a second circular arc concentrically formed with the first circular arc while having a second radius greater than the first radius.

Preferably, but not necessarily, the first magnetic element part may include first to third magnetic elements each spaced apart from the other magnetic element, and the second magnetic element part may include fourth and fifth magnetic elements each spaced apart from the other magnetic element.

Preferably, but not necessarily, the circuit board may further comprise: a first conductive line connected to the power terminal, the first magnetic element, the second magnetic element and the third magnetic element; and a second conductive line connected to the second power terminal the fourth magnetic element and the fifth magnetic element.

Preferably, but not necessarily, the first to fifth magnetic elements may be Hall elements configured to detect a magnetic force.

Preferably, but not necessarily, the circuit board may further comprise: a first ground contact part electrically connected to the first magnetic element part; and a second ground contact part electrically connected to the second magnetic element part by being spaced apart from the first ground contact part.

Preferably, but not necessarily, a central angle of the second circular arc may be overlapped with at least a part of a central angle of the first circular arc.

In another general aspect of the present disclosure, there is provided a motor, comprising: a circuit board; a housing configured to accommodate the circuit board; a stator fixed to the housing; a rotor disposed at an inner side of the stator to rotate through an electric interaction with the stator; a rotation shaft rotating integrally with the rotor; and a sensing magnet disposed at the rotation shaft, wherein the circuit board includes; a first magnetic element part; a second magnetic element part spaced apart from the first magnetic element part; a first power terminal electrically connected to the first magnetic element part; and a second power terminal electrically connected to the second magnetic element part by being spaced apart from the first power terminal, and wherein the first and second magnetic element parts of the circuit board detect the sensing magnet.

Preferably, but not necessarily, the motor may further comprise: a sensing plate coupled to the rotation shaft by being upwardly spaced apart from the rotor, and the sensing magnet may be coupled to an upper surface of the sensing plate.

Preferably, but not necessarily, the motor may further comprise: a first bearing configured to support a bottom surface of the rotation shaft; and a second bearing configured to support an upper surface of the rotation shaft.

Preferably, but not necessarily, the motor may further comprise: a support pipe protruded from a central part of a bottom surface of the housing, and the first bearing may be mounted at the support pipe.

In still another general aspect of the present disclosure, there is provided an electronic power steering system, comprising: a motor; and an electronic controller configured to drive the motor in response to an operating condition of a vehicle; wherein the motor includes: a circuit board; a housing configured to accommodate the circuit board; a stator fixed to the housing; a rotor disposed at an inner side of the stator to rotate through an electric interaction with the stator; a rotation shaft rotating integrally with the rotor; and a sensing magnet disposed at the rotation shaft, and wherein the circuit board includes; a first magnetic element part; a second magnetic element part spaced apart from the first magnetic element part; a first power terminal electrically connected to the first magnetic element part; and a second power terminal electrically connected to the second magnetic element part by being spaced apart from the first power terminal, and wherein the first and second magnetic element parts of the circuit board detect the sensing magnet.

Preferably, but not necessarily, the electronic power steering system may further comprise a sensor configured to detect an operating condition of a vehicle.

Preferably, the sensor is a vehicle speed sensor, a torque angle sensor and a torque sensor.

Advantageous Effects of the Disclosure

The exemplary embodiment of the present disclosure has an advantageous effect in that danger of safety accident can be significantly reduced during operation of a vehicle by enabling a minimum number of Hall elements to be driven even during damage to a power terminal or to a ground unit due to defect in circuit by separately forming a power terminal supplying a power to a plurality of magnetic elements in a plurality of numbers.

DETAILED DESCRIPTION OF THE DISCLOSURE

Figure 1:
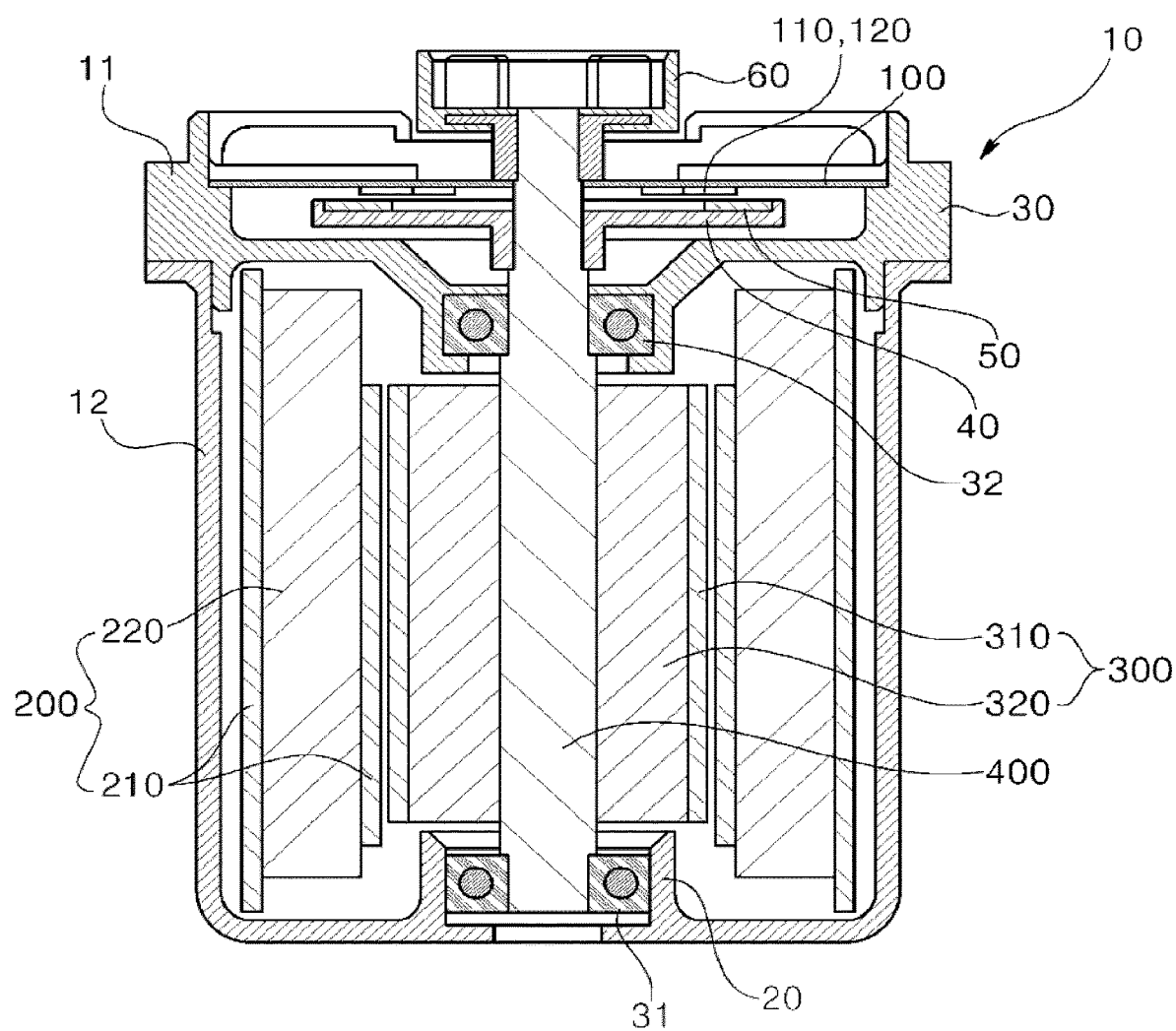
FIG. 1 is a cross-sectional conceptual view illustrating a motor according to an exemplary embodiment of the present disclosure.

Hereinafter, configuration and operation of the present disclosure will be described in detail with reference to the accompanying drawings. In the drawings, like reference numerals designate like elements throughout the specification and no redundant descriptions thereto will be made. Thus, it will be understood that, although the terms first, second, etc. may be used herein to describe various elements, these elements should not be limited by these terms. These terms are only used to distinguish one element from another.

FIG. 1 is a cross-sectional conceptual view illustrating a motor according to an exemplary embodiment of the present disclosure.

Referring to FIG. 1, a motor according to an exemplary embodiment of the present disclosure may include a housing (10) which is an exterior material. The housing (10) may include a case (12) formed with an inner space and an upper opening by a bottom surface and a lateral wall extensively and upwardly formed from the bottom surface, and a bracket (11) covering the upper opening of the case (12) and centrally formed with an opening.

The housing (10) may be mounted therein with a stator (200) and a rotor (300). The rotor (300) may include a rotor core (320) coupled to a rotation shaft (400) and a magnet (310) coupled to a periphery of the rotor core (320).

Meantime, the rotation shaft (400) may be disposed inside the housing (10). The rotation shaft (400) may be disposed with a sensing magnet (50). The rotation shaft (400) may be coupled with a sensing plate (190) so disposed as to be upwardly distanced from the rotor (300), and the sensing plate (190) may be rotated along with the rotation shaft (400). The sensing magnet (50) may be coupled to an upper surface of the sensing plate (190) (hereinafter, a structure including the sensing plate (190) and the sensing magnet (50) will be referred as "magnet module"). Furthermore, the bracket (11) may be mounted with a circuit board (100).

To be more specific, the circuit board (100) may be accommodated inside the housing (10) by being mounted at the bracket (11). The circuit board (100) may be mounted with a magnetic element (110) opposite to the sensing magnet (50). The magnetic element (110) may detect a rotated degree of the sensing plate (190) coupled by the sensing magnet (50) and of the rotation shaft (400) by detecting a rotated degree of the sensing magnet (50).

An exemplary embodiment of the present disclosure may provide a circuit board mounted with a plurality of magnetic elements (10) adjacently arranged with the magnet module in order to detect a magnetic force of the magnetic module. Furthermore, the circuit board (100) may be realized in a structure where a plurality of power terminals supplying a power source by being respectively connected to the magnetic elements (110) is separately arranged.

Thus, the circuit board (100) according to the exemplary embodiment of the present disclosure is configured in a manner such that even if some of power terminals or ground contact parts are rendered to be inoperative due to defect on a circuit, other remaining power terminals or ground contact parts may operate normally. As a result thereof, a rotated degree of sensing magnet (50) can be detected by the magnet element supplied with a power source from the normally operating power terminals.

Figure 2:
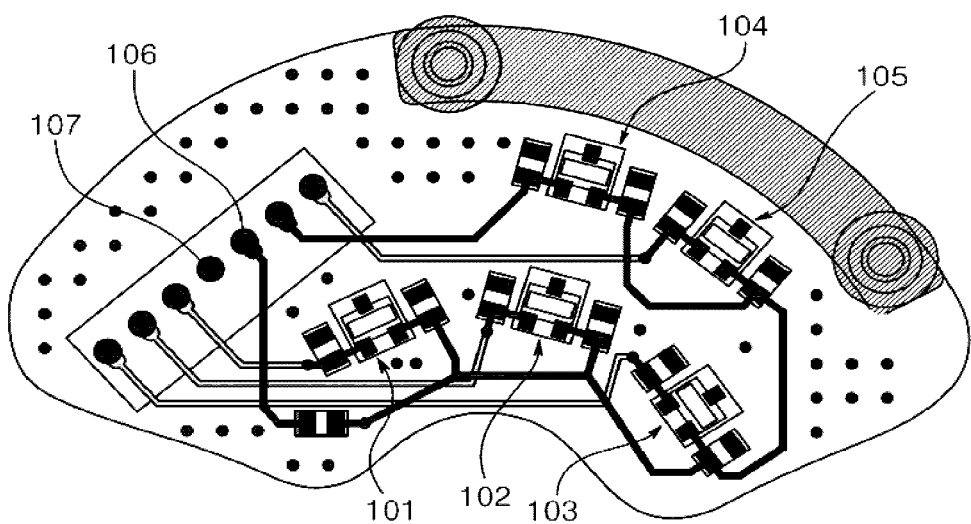
FIG. 2 is a conceptual view illustrating a circuit board according to a comparative example of the present disclosure.
Figure 3:
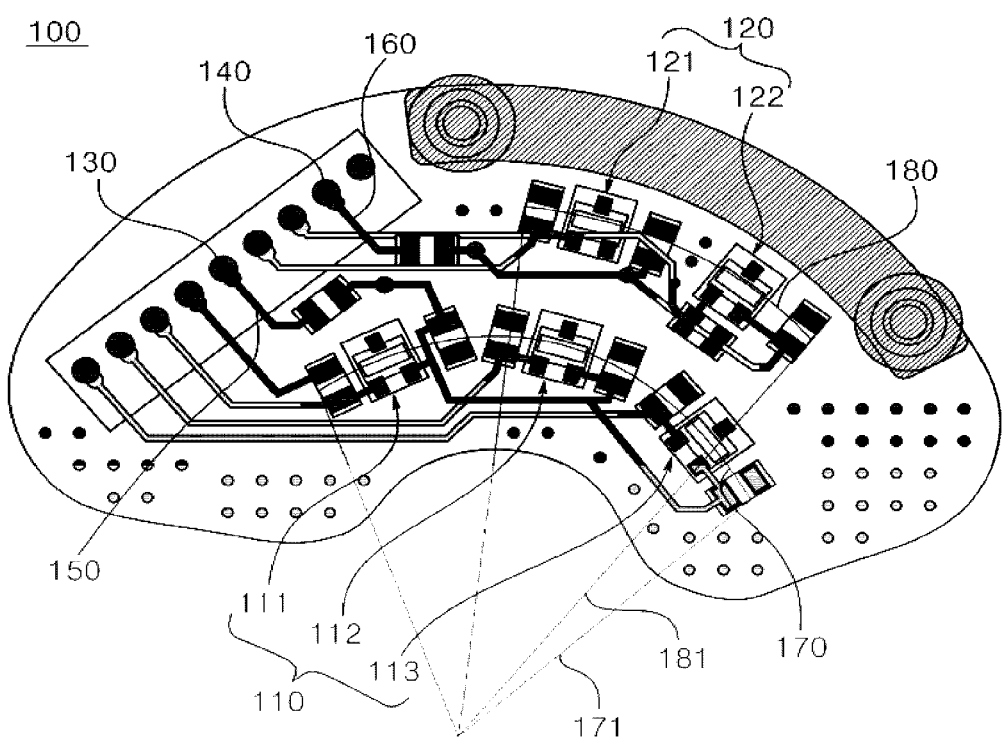
FIG. 3 is a conceptual view illustrating a circuit board according to an exemplary embodiment of the present disclosure.

FIG. 2 is a conceptual view illustrating a circuit board according to a comparative example of the present disclosure, and FIG. 3 is a conceptual view illustrating a circuit board according to an exemplary embodiment of the present disclosure.

As discussed above, the circuit board (100) according to the exemplary embodiment of the present disclosure may be characterized by a circuit arrangement structure of a power terminal supplying a power source to Hall elements being separately formed.

A circuit board of FIG. 2 is a comparative example that may be compared with the exemplary embodiment of the present disclosure, where a power terminal (Vcc, 106) supplying a power source to a plurality of magnetic elements (101, 102, 103, 104, 105) mounted on the circuit board is connected through a circuit pattern, and the power terminal (106) is grounded through a single ground contact part (GND, 107). However, the circuit board according to the comparative example is such that a power supply may be interrupted to an entire magnetic element when a circuit pattern is short-circuited or the ground contact part is damaged. As a result thereof, an operation of steering system of a vehicle may be stopped or erroneously performed to thereby cause a fatal problem to a vehicle.

Thus, as illustrated in FIG. 3, a board may be arranged with a first magnetic element part (110) and a second magnetic element part (120) spaced apart from the first magnetic element part (110) according to an exemplary embodiment of the present disclosure. The first magnetic element part (110) may include first, second and third magnetic elements (111, 112, 113) each spaced apart from the other element. The first, second and third magnetic elements (111, 112, 113) may be electrically connected to a first power terminal (VCC1, 130) spaced apart from the first, second and third magnetic elements (111, 112, 113). The first, second and third magnetic elements (111, 112, 113) may be electrically connected to a first power terminal (130) via a first conductive line (150).

The second magnetic element part (120) may include fourth and fifth magnetic elements (121, 122) each spaced apart from the other element. The fourth and fifth magnetic elements (121, 122) may be electrically connected to a second power terminal (VCC2, 140) spaced apart from the fourth and fifth magnetic elements (121, 122). The fourth and fifth magnetic elements (121, 122) may be electrically connected to a second power terminal (140) via a second conductive line (160).

That is, a power terminal supplying a power source to the magnetic elements can be separately formed. As a result thereof, even if anyone of circuit patterns is developed with a defect, not all magnetic elements are stopped in function but some of the magnetic elements free from defect can be driven. Of course, a first ground contact part (not shown) grounded by being electrically connected to the first power terminal (122), and a second ground contact part (not shown) grounded by being electrically connected to a second power terminal (124) may be also separately formed.

The first ground contact part and the second ground contact part may be spaced apart from each other, whereby the risk caused by defect can be further reduced. Of course, it should be apparent to the skilled in the art that, although the comparative example of FIG. 2 has exemplified five (5) magnetic elements, the present disclosure is not limited thereto, and more plural magnetic elements can be arranged, and therefore, no further elaboration thereto will be omitted.

Furthermore, the power terminal connected to a plurality of magnetic elements may be also formed in a plural number. That is, the power terminal may be formed by a first power terminal connected to n number of mutually adjacent magnetic elements and a second power terminal connected to m number of magnetic elements separated from the n number of magnetic elements, where it is also possible to form three or more power terminals (n, m are natural numbers). In addition, the magnetic elements according to the present disclosure may be applied with Hall elements.

Hereinafter, other configuration and operation of EPS motor mounted with a circuit board (100) according to an exemplary embodiment of the present disclosure will be described in detail with reference to FIGS. 1 and 2.

That is, a motor mounted with a circuit board (100) according to an exemplary embodiment of the present disclosure may further include a support pipe (20) protruded from a bottom central part of a case (12). The support pipe (20) may be mounted with a first bearing (31) and a bracket (11) may be mounted with a second bearing (32). The first and second bearings (31, 32) are contact-supported by a rotation shaft (400), where an upper surface of the rotation shaft (400) may be supported by the second bearing (32), and a bottom surface of the rotation shaft (400) may be supported by the first bearing (31).

An upper distal end of the rotation shaft (400) may be upwardly extended through the bracket (11), and may be coupled to a structure (60) connected to a steering shaft (not shown). The housing (10) may be mounted therein with a stator (200) and a rotor (300). The rotor (300) may include a rotor core (320) coupled to the rotation shaft (400), and a magnet (310) coupled to a periphery of the rotor core (320). Although the present exemplary embodiment has explained and illustrated a structure where the magnet (310) is coupled to a periphery of the rotor core (320), the present exemplary embodiment may alternatively include a structure where the magnet (310) is inserted into the rotor core (320).

The stator (200) may be fixed into the housing (10), and may include a stator core (210) interposed between the magnet (310) and the housing (10), and a coil (220) wound on the stator core (210). The stator (200) and the rotor (300) may be electrically interacted. As a result thereof, the rotor (300) can rotate. In this case, the rotation shaft (400) may integrally rotate with the rotor (300).

The bracket (11) may be mounted with a circuit board (100), and the circuit board (100) may be arranged with first and second magnetic element parts (110, 120). In this case, magnetic elements (111, 112, 113, 121, 122) detect a rotated degree of sensing plate (190) coupled by the sensing magnet (50) and a rotated degree of the rotation shaft (400) by detecting a rotated degree of the sensing magnet (50).

Referring to FIG. 2, the first magnetic element part (110) may be disposed on a first circular arc (170) having a first radius (171), and the second magnetic element part (120) may be disposed on a second circular arc (181) concentrically formed with the first circular arc (170), where a second radius is greater than the first radius. As a result thereof, the detection capability can be enhanced because the first and second magnetic element parts (110, 120) are positioned along a moving path of the sensing magnet (50) forming a circular trace.

Furthermore, a central angle of the second circular arc may be included into a central angle of the first circular arc. That is, the central angle of the second circular arc may be overlapped with at least a part of the central angle of the first circular arc. As a result thereof, it is convenient to comparatively analyze a measurement value of the first and second magnetic element parts, and accuracy of measurement can be mutually guaranteed.

To wrap up, the circuit board (100) according to the exemplary embodiment of the present disclosure has an advantageous effect in that danger of safety accident can be significantly reduced during operation of a vehicle by enabling a minimum number of Hall elements to be driven even during damage to a power terminal or to a ground unit due to defect in circuit by separately forming a power terminal supplying a power to a plurality of magnetic elements in a plurality of numbers.

Although the present disclosure has been described in detail with reference to the foregoing embodiments and advantages, many alternatives, modifications, and variations will be apparent to those skilled in the art within the metes and bounds of the claims. Therefore, it should be understood that the above-described embodiments are not limited by any of the details of the foregoing description, unless otherwise specified, but rather should be construed broadly within the scope as defined in the appended claims.

What is claimed is:
1. A circuit board, comprising:
a first magnetic element part;
a second magnetic element part spaced apart from the first magnetic element part;
a first power terminal electrically connected to the first magnetic element part;
a second power terminal electrically connected to the second magnetic element part;
a first ground contact part electrically connected to the first magnetic element part; and
a second ground contact part electrically connected to the second magnetic element part, wherein the first magnetic element part comprises a plurality of magnetic elements, and the second magnetic element part comprises a plurality of magnetic elements, wherein the plurality of magnetic elements of the first magnetic element part are disposed along a first circular arc having a first radius, wherein the plurality of magnetic elements of the second magnetic element part are disposed along a second circular arc having a second radius greater than the first radius, wherein the second power terminal is spaced apart from the first power terminal, and wherein the second ground contact part is spaced apart from the first ground contact part.

2. The circuit board of claim 1, wherein the first circular arc and the second circular arc are concentric.

3. The circuit board of claim 1, wherein the first magnetic element part includes first to third magnetic elements spaced from each other, and the second magnetic element part includes fourth and fifth magnetic elements spaced from each other.

4. The circuit board of claim 3, further comprising:
a first conductive line connected to the first power terminal, the first magnetic element, the second magnetic element and the third magnetic element; and
a second conductive line connected to the second power terminal, the fourth magnetic element and the fifth magnetic element.

5. The circuit board of claim 3, wherein the first to fifth magnetic elements are Hall sensors to detect a magnetic force.

6. The circuit board of claim 3, wherein the first to third magnetic elements are disposed on one side of the circuit board, and the fourth and fifth magnetic elements are disposed on an other side of the circuit board.

7. The circuit board of claim 1, wherein a central angle of the second circular arc is overlapped with at least a part of a central angle of the first circular arc.

8. A circuit board, comprising:
a first sensing element part;
a second sensing element part electrically disconnected from the first sensing element part;
a first power terminal electrically connected to the first sensing element part;
a second power terminal electrically connected to the second sensing element part;
a first ground contact part electrically connected to the first sensing element part; and
a second ground contact part electrically connected to the second sensing element part,
wherein the first sensing element part comprises a plurality of first sensing elements disposed along a first circular arc having a first radius,
wherein the second sensing element part comprises a plurality of second sensing elements disposed along a second circular arc having a second radius greater than the first radius,
wherein the second power terminal is electrically disconnected from the first power terminal, and
wherein the second ground contact part is electrically disconnected from the first ground contact part.

9. The circuit board of claim 8, wherein the first circular arc and the second circular arc are concentric.

10. The circuit board of claim 8, wherein the first sensing element part includes first to third sensing elements spaced from each other, and the second sensing element part includes fourth and fifth sensing elements spaced from each other.

11. The circuit board of claim 10, further comprising:
a first conductive line connected to the first power terminal, the first sensing element, the second sensing element and the third sensing element; and
a second conductive line connected to the second power terminal, the fourth sensing element and the fifth sensing element.

12. The circuit board of claim 10, wherein the first to fifth sensing elements are Hall sensors to detect a magnetic force.

13. The circuit board of claim 10, wherein the first to third sensing elements are disposed on one side of the circuit board, and the fourth and fifth sensing elements are disposed on an other side of the circuit board.

14. The circuit board of claim 8, wherein a central angle of the second circular arc is overlapped with at least a part of a central angle of the first circular arc.

15. A sensing module comprising:
a magnet module comprising a sensing magnet and a sensing plate; and
a circuit board adjacently arranged with the magnet module,
the circuit board including:
a first sensing element part;
a second sensing element part electrically disconnected from the first sensing element part;
a first power terminal electrically connected to the first sensing element part;
a second power terminal electrically connected to the second sensing element part;
a first ground contact part electrically connected to the first sensing element part; and
a second ground contact part electrically connected to the second sensing element part,
wherein the first sensing element part comprises a plurality of first sensing elements disposed along a first circular arc having a first radius,
wherein the second sensing element part comprises a plurality of second sensing elements disposed along a second circular arc having a second radius greater than the first radius,
wherein the second power terminal is electrically disconnected from the first power terminal, and
wherein the second ground contact part is electrically disconnected from the first ground contact part.

16. The sensing module of claim 15, wherein the first circular arc and the second circular arc are concentric.

17. The sensing module of claim 15, wherein the first sensing element part includes first to third sensing elements spaced from each other, and the second sensing element part includes fourth and fifth sensing elements spaced from each other.

18. The sensing module of claim 17, further comprising:
a first conductive line connected to the first power terminal, the first sensing element, the second sensing element and the third sensing element; and
a second conductive line connected to the second power terminal, the fourth sensing element and the fifth sensing element.

19. The sensing module of claim 17, wherein the first to fifth sensing elements are Hall sensors to detect a magnetic force.

20. The sensing module of claim 17, wherein the first to third sensing elements are disposed on one side of the circuit board, and the fourth and fifth sensing elements are disposed on an other side of the circuit board.

21. The sensing module of claim 15, wherein a central angle of the second circular arc is overlapped with at least a part of a central angle of the first circular arc.

22. A motor, comprising:
a housing;
a bracket mounted with the housing;
a circuit board mounted with the bracket;
a stator disposed in the housing;
a rotor disposed at an inner side of the stator;
a rotation shaft fixed with the rotor; and
a sensing magnet fixed with the rotation shaft,
wherein the circuit board includes:
a first sensing element part;
a second sensing element part electrically disconnected from the first sensing element part;
a first power terminal electrically connected to the first sensing element part;
a second power terminal electrically connected to the second sensing element part;
a first ground contact part electrically connected to the first sensing element part; and
a second ground contact part electrically connected to the second sensing element part,
wherein the first sensing element part comprises a plurality of first sensing elements disposed along a first circular arc having a first radius,
wherein the second sensing element part comprises a plurality of second sensing elements disposed along a second circular arc having a second radius greater than the first radius,
wherein the second power terminal is electrically disconnected from the first power terminal, and
wherein the second ground contact part is electrically disconnected from the first ground contact part.

23. The motor of claim 22, wherein the first circular arc and the second circular arc are concentric.

24. The motor of claim 22, wherein the first sensing element part includes first to third sensing elements spaced from each other, and the second sensing element part includes fourth and fifth sensing elements spaced from each other.

25. The motor of claim 24, further comprising:
a first conductive line connected to the first power terminal, the first sensing element, the second sensing element and the third sensing element; and
a second conductive line connected to the second power terminal, the fourth sensing element and the fifth sensing element.

26. The motor of claim 24, wherein the first to fifth sensing elements are Hall sensors to detect a magnetic force.

27. The motor of claim 24, wherein the first to third sensing elements are disposed on one side of the circuit board, and the fourth and fifth sensing elements are disposed on an other side of the circuit board.

28. The motor of claim 22, wherein a central angle of the second circular arc is overlapped with at least a part of a central angle of the first circular arc.

29. The motor of claim 22, further comprising a sensing plate coupled to the rotation shaft upwardly spaced apart from the rotor,
wherein the sensing magnet is coupled to an upper surface of the sensing plate.

30. The motor of claim 22, wherein the circuit board is disposed on the bracket, and
the first sensing element part and the second sensing element part are disposed on the circuit board and facing the sensing magnet.

* * * * *